Patented Mar. 24, 1936

2,034,802

UNITED STATES PATENT OFFICE 2,034,802

ACIDPROOF SELF-HARDENING COMPOSITION

Karl Frank and Karl Dietz, Frankfort-on-the-Main, and Franz Privinsky, Hofheim in Taunus, and Emil Thiel, Frankfort-on-the-Main, Germany, assignors, by mesne assignments, to Pen-Chlor, Inc., Philadelphia, Pa., a corporation of Delaware No Drawing. Application June 2, 1931, Serial No. 541,736. Renewed September 28, 1933. In Germany June 7, 1930

4 Claims. (Cl. 106—22)

The present invention relates to materials for cementing, coating and painting and to a process of preparing them.

We have found that materials for cementing, coating and painting purposes which become hard at room temperature can be made from liquid phenol-aldehyde resins by adding neutral compounds. The materials obtained are used for acid-proof linings and for coatings of apparatus, for the construction of containers for acid or acid material and for the preparation of paints. As liquid phenol-aldehyde resins there may be used the condensation products of phenols with aldehydes which have only been condensed to such an extent that they are still in a liquid condition and are capable of being hardened, for instance phenol-formaldehyde condensation products, cresol-formaldehyde condensation products. As neutral compounds having the property to harden at room temperature or to finish the condensation of the liquid phenol-aldehyde resin at room temperature there may, for instance, be used: pulverized neutral salts, neutral metal oxides, neutral salts of alkyl sulfuric acids and aromatic sulfo-chlorides.

These substances are added to the liquid phenol-aldehyde masses either alone or in combination with acid-proof filling materials, such as pulverized quartz, silex white, if desired, furthermore with the addition of acid-proof materials having good thermal conductivity, such as silicon, silicon alloys and graphite. The masses are hardened at ordinary temperature. A small amount of the above mentioned neutral compounds, for instance 5 per cent. related to the whole cementing or painting material is already sufficient to cause the hardening of the materials at room temperature. The amount of the acid-proof filling materials added to the phenol-aldehyde resin depends on the consistency of the final products and may be varied within wide limits. When, for instance, materials for painting are to be produced, a mixture of about 100 parts of the filling agents and about 60-80 parts of the liquid phenol-aldehyde resin is used. Cementing materials may contain, for instance about 100 parts of the filling agents and 20-30 parts of the liquid phenol-aldehyde resin.

The cement materials, plaster or paints prepared by means of these masses are solid, hard, acid-proof and resistant to pressure and friction. When compared with the artificial masses hardened by the addition of acid substances, the new mixtures prepared according to this invention possess the advantage of being applicable on metallic surfaces, as these surfaces are not corroded.

The following examples serve to illustrate the invention, but they are not intended to limit it thereto, the parts being by weight:

1. 10 parts of finely pulverized titanium sulfate, 45 parts of a fine and amorphous silica and 45 parts of pulverized quartz are mixed and then mixed with a liquid phenol-formaldehyde mass so as to obtain a plastic cementing mass which can easily be further used. This cementing mass solidifies at room temperature within 24 hours.

The titanium sulfate may also be replaced by other neutral compounds, such as manganese dioxide, lead dioxide, neutral persulfates, toluene-sulfo chlorides or the like.

Instead of the phenol-formaldehyde masses there may be used condensation products of other phenols with aldehydes, for instance the condensation product of cresol and formaldehyde.

The cementing masses thus prepared may be used for all those purposes for which a self-hardening, tight cementing material is required, for instance also for preparing cemented insulators.

2. 100 grams of a cement powder consisting of 70 per cent. of pulverized quartz, 20 per cent. of siliceous sinter and 10 per cent. of para-toluene-sulfo chloride are stirred with 25-30 cc. of liquid phenol-aldehyde resin. The mixture yields a cementing composition which can also be used as a filling mass to be applied with a palette knife.

3. 100 grams of a cement powder consisting of 70 per cent. of finely pulverized quartz, 20 per cent. of siliceous sinter and 10 per cent. of ortho-toluene-sulfo chloride are stirred with 75-85 cc. of a liquid phenol-aldehyde resin so as to obtain a thin magma which can be used for preparing acid-proof coatings and paintings.

We claim:

1. Acid-proof self-hardening compositions containing a liquid phenolaldehyde resin capable of being hardened and a neutral aromatic sulfochloride.

2. Acid-proof self-hardening compositions containing a liquid phenolaldehyde resin capable of being hardened, acid-proof filling agents and a neutral aromatic sulfochloride.

3. Acid-proof self-hardening compositions containing a liquid phenolaldehyde resin capable of being hardened and para-toluene-sulfochloride.

4. Acid-proof self-hardening compositions containing a liquid phenolaldehyde resin capable of being hardened, acid-proof filling agents and para-toluene-sulfochloride.

KARL FRANK.
KARL DIETZ.
FRANZ PRIVINSKY.
EMIL THIEL.